United States Patent
Lin et al.

(10) Patent No.: US 10,631,608 B2
(45) Date of Patent: Apr. 28, 2020

(54) FOLDABLE DISPLAY DEVICE

(71) Applicant: AU Optronics Corp., Hsin-Chu (TW)

(72) Inventors: Po-Yang Lin, Hsin-Chu (TW);
Chia-Hsun Tu, Hsin-Chu (TW);
Keh-Long Hwu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 30 days.

(21) Appl. No.: 15/694,925

(22) Filed: Sep. 4, 2017

(65) Prior Publication Data
US 2017/0360170 A1  Dec. 21, 2017

Related U.S. Application Data

(62) Division of application No. 14/519,276, filed on Oct. 21, 2014, now Pat. No. 9,844,251.

(30) Foreign Application Priority Data

Jun. 18, 2014  (TW) ............................. 103121046 A

(51) Int. Cl.
*A45C 13/00* (2006.01)
*A45C 11/00* (2006.01)
*G06F 1/16* (2006.01)

(52) U.S. Cl.
CPC ............ *A45C 13/004* (2013.01); *A45C 11/00* (2013.01); *G06F 1/1615* (2013.01);
(Continued)

(58) Field of Classification Search
CPC . A45C 13/004; A45C 11/00; A45C 2011/003;
G06F 1/1641; G06F 1/1615; G06F 1/1652; G06F 1/1601; G06F 1/1613; G06F 1/1616; G06F 1/1622; G06F 1/1626
(Continued)

(56) References Cited

U.S. PATENT DOCUMENTS 5,172,575 A   12/1992  Fisher
8,477,464 B2   7/2013  Visser et al.
(Continued)

FOREIGN PATENT DOCUMENTS

| CN | 2750585 Y | 1/2006 |
|---|---|---|
| CN | 103778858 A | 5/2014 |
| TW | I413037 | 10/2013 |

OTHER PUBLICATIONS

Office Action issued in corresponding China patent application dated Feb. 1, 2016.

*Primary Examiner* — Cassandra Davis
(74) *Attorney, Agent, or Firm* — McClure, Qualey & Rodack, LLP

(57) ABSTRACT

A foldable display device includes a shell. The shell has an expanding state and a folding state. A first direction and a second direction are defined to be orthogonal. When the shell is at the expanding state, the shell has a first length L1 along the first direction and a second length L2 along the second direction. The ratio of the first length L1 to the second length L2 is between 1.3 and 2. When the shell is at the folding state, the shell has a third length L3 along the second direction and a fourth length L4 along the first direction. The ratio of the third length L3 to the fourth length L4 is also between 1.3 and 2.

5 Claims, 14 Drawing Sheets

(52) U.S. Cl.
CPC .......... *G06F 1/1641* (2013.01); *G06F 1/1652* (2013.01); *A45C 2011/003* (2013.01)

(58) Field of Classification Search
USPC ........................................ 361/679.26–679.3
See application file for complete search history.

(56) References Cited

U.S. PATENT DOCUMENTS

| | | | |
|---|---|---|---|
| 8,804,349 B2 | 8/2014 | Lee et al. | |
| 8,928,552 B2* | 1/2015 | Aono | G06F 1/1616 345/1.1 |
| 9,823,697 B2* | 11/2017 | Hsu | G06F 1/1618 |
| 2003/0160755 A1* | 8/2003 | Gettemy | G06F 1/1613 345/156 |
| 2006/0146488 A1* | 7/2006 | Kimmel | G06F 1/1616 361/679.04 |
| 2012/0002360 A1* | 1/2012 | Seo | G06F 1/1616 361/679.01 |
| 2012/0139815 A1* | 6/2012 | Aono | G06F 1/1616 345/1.3 |
| 2013/0010405 A1* | 1/2013 | Rothkopf | H04M 1/0216 361/679.01 |
| 2013/0021762 A1 | 1/2013 | van Dijk et al. | |
| 2013/0222998 A1 | 8/2013 | Cho et al. | |
| 2014/0211399 A1* | 7/2014 | O'Brien | G06F 1/1624 361/679.26 |
| 2015/0233162 A1 | 8/2015 | Lee et al. | |
| 2015/0261259 A1* | 9/2015 | Endo | G06F 1/1652 361/679.06 |
| 2016/0366772 A1* | 12/2016 | Choi | G06F 1/1616 |
| 2017/0139442 A1* | 5/2017 | Yoshizumi | H04M 1/0268 |

* cited by examiner

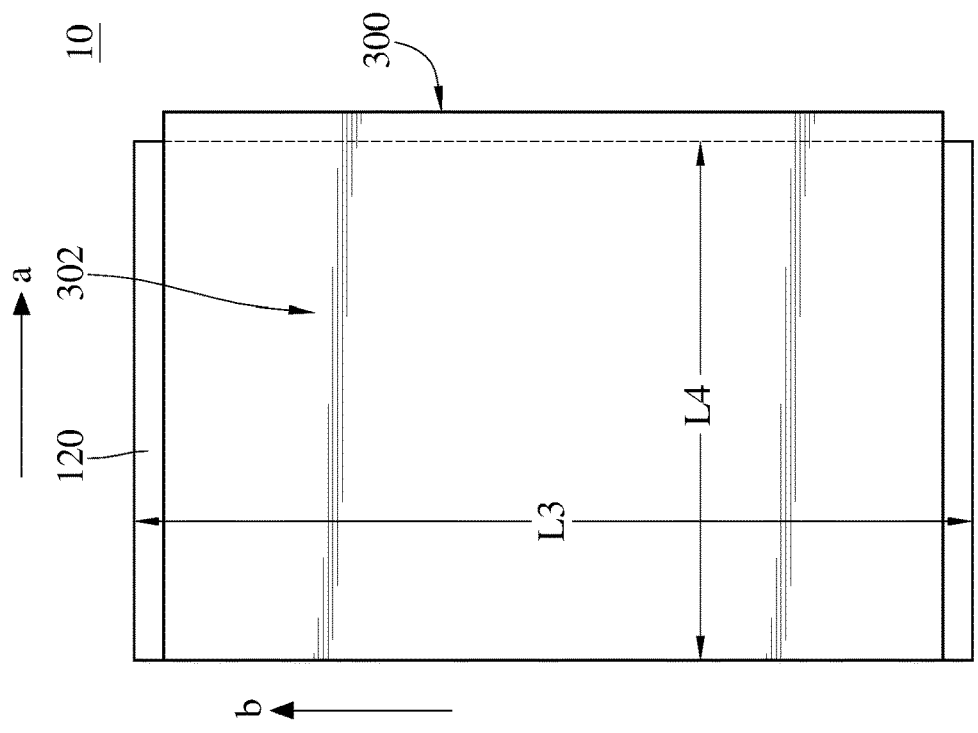
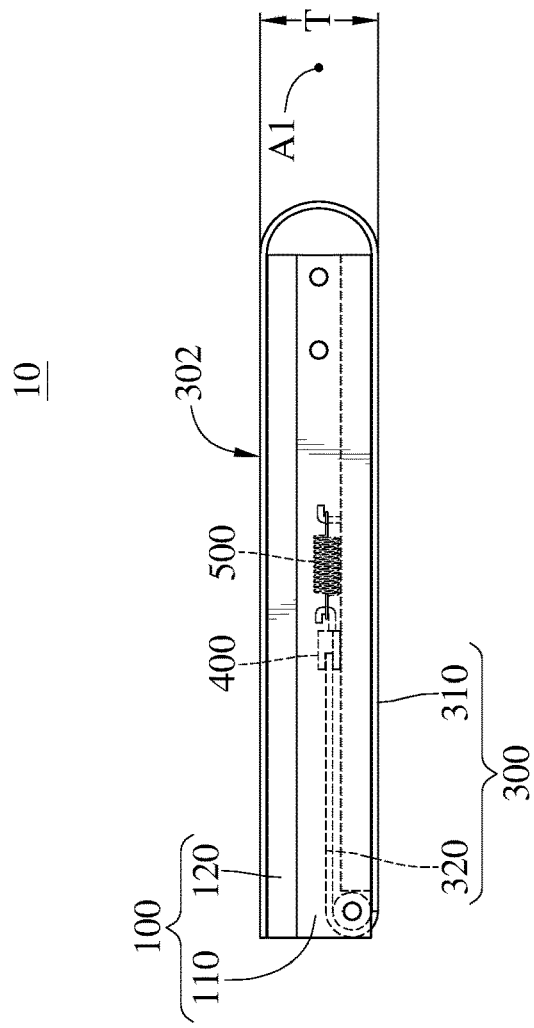
FIG. 7
FIG. 6

FOLDABLE DISPLAY DEVICE

CROSS-REFERENCE TO RELATED APPLICATIONS

This application is a division of U.S. application Ser. No. 14/519,276, filed Oct. 21, 2014, now U.S. Pat. No. 9,844,251, which claims the benefit of priority based on Patent Application No(s). 103121046 filed in Taiwan, R.O.C. on Jun. 18, 2014, the entire contents of which are hereby incorporated by reference.

BACKGROUND

Technical Field

The disclosure relates to a foldable display device. More particularly, the disclosure relates to a foldable display device which comprises a flexible display.

Background

In recent years, with the development of flexible display technology, flexible displays have been applied to many consumer products. Take a foldable electronic product for example, when a user wants to use his foldable electronic product, the foldable electronic product may be expanded and a display screen of the foldable electronic product may be fully expanded at the same time, such that the display screen of the foldable electronic product becomes larger. When the user needs to carry his foldable electronic product, it is convenient for the user by folding the foldable electronic product to decrease its size. However, when the foldable electronic product is folded, the display screen of the foldable electronic product becomes smaller and it will change the aspect ratio of the foldable electronic product.

Thus, after the foldable electronic product is folded, the aspect ratio of the foldable electronic product may not achieve the aesthetic concept (the aspect ratio shall be between 1.3 and 2). For example, when the foldable electronic product is in an expanded state (namely, being expanded), the aspect ratio is 1.62 (which achieves the aesthetic concept). However, after the foldable electronic product is folded, the aspect ratio becomes 1.23 (which does not achieve the aesthetic concept). When the aspect ratio of the foldable electronic product does not achieve the aesthetic concept, the aesthetic of the foldable electronic product may be affected. Additionally, the aspect ratio of the display screen may also be affected, and it is uncomfortable for the user to view the display screen. Accordingly, it is important to provide a foldable electronic product with the screen that achieves the aesthetic concept, no matter the foldable electronic product is folded or expanded.

SUMMARY

One aspect of the disclosure provides a foldable display device which comprises a shell. The shell has an expanding state and a folding state. A first direction and a second direction are defined to be orthogonal. When the shell is at the expanding state, the shell has a first length L1 along the first direction and a second length L2 along the second direction. The ratio of the first length L1 to the second length L2 is between 1.3 and 2. When the shell is at the folding state, the shell has a third length L3 along the second direction and a fourth length L4 along the first direction. The ratio of the third length L3 to the fourth length L4 is also between 1.3 and 2.

BRIEF DESCRIPTION OF THE DRAWINGS

The disclosure will become more fully understood from the detailed description given herein-below and the accompanying drawings which are given by way of illustration only and thus are not limitative of the disclosure, and wherein:

FIG. 6 is a side view of the foldable display device of FIG. 1 being at a folding state;

FIG. 7 is a top view in FIG. 6;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
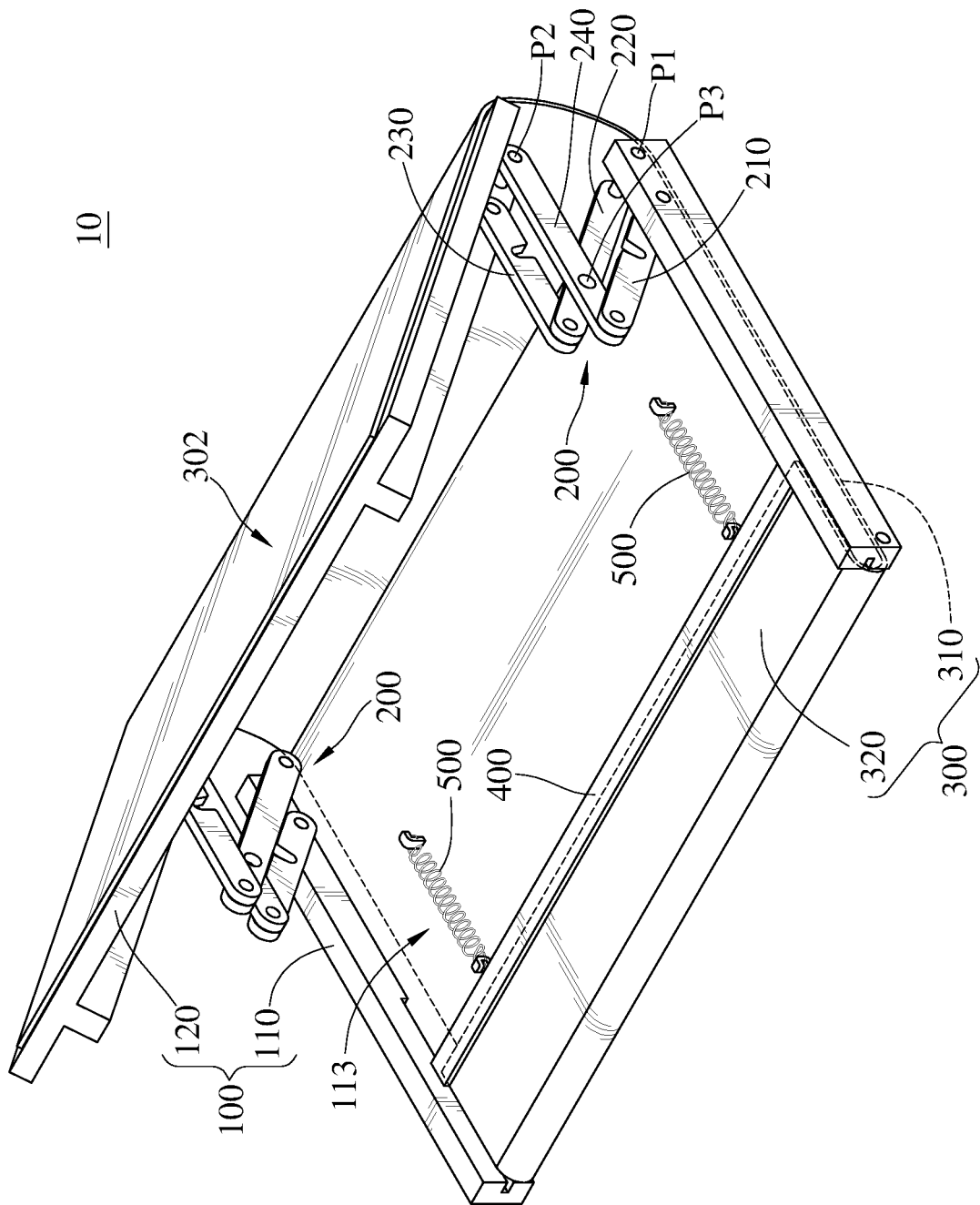
FIG. 1 is a perspective view of a foldable display device according to a first embodiment of the disclosure.
Figure 2:
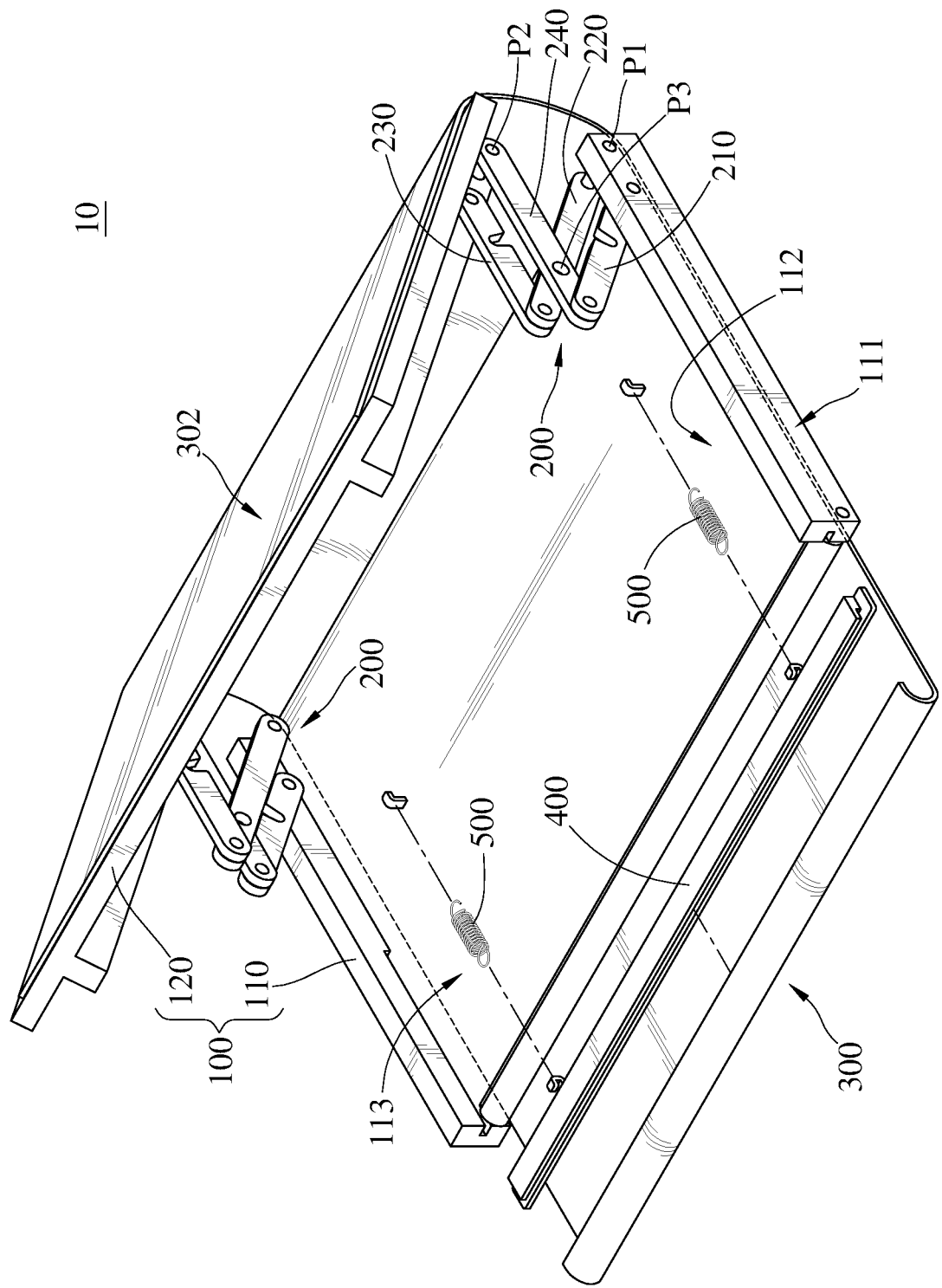
FIG. 2 is an exploded view in FIG. 1.
Figure 3:
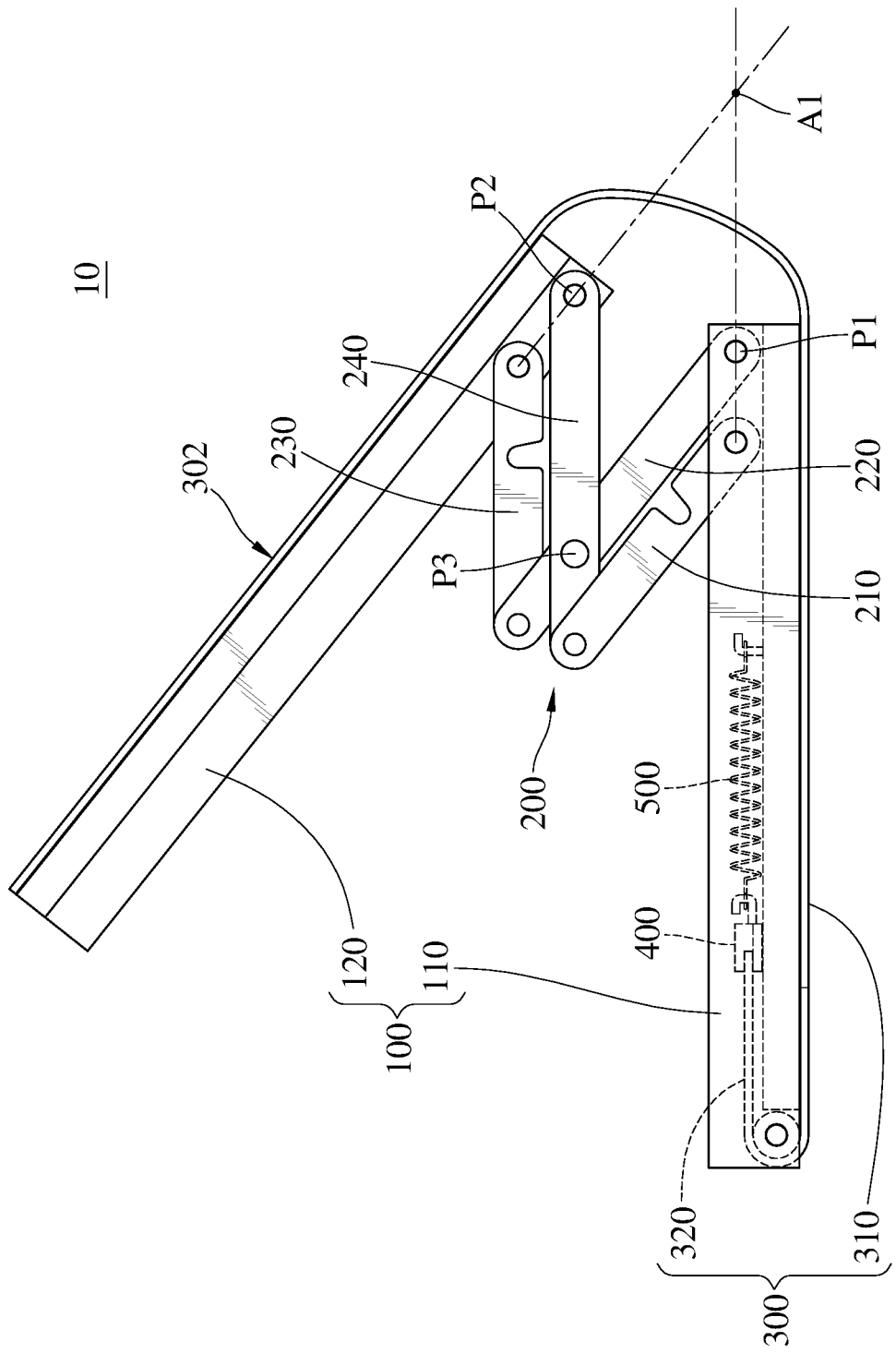
FIG. 3 is a side view in FIG. 1.

Please refer to FIG. 1 to FIG. 3. FIG. 1 is a perspective view of a foldable display device according to a first embodiment of the disclosure. FIG. 2 is an exploded view in FIG. 1. FIG. 3 is a side view in FIG. 1. In this embodiment, the foldable display device 10 comprises a shell 100, a parallel linkage mechanism 200, a flexible display 300, a connecting part 400 and an elastic component 500.

In this embodiment, the shell 100 has an expanding state and a folding state. The shell 100 comprises a first shell 110 and a second shell 120. The first shell 110 and the second shell 120 pivot on two opposite sides of the parallel linkage mechanism 200 respectively, such that the second shell 120 is capable of rotating around a rotating axis A1 relative to the first shell 110. Accordingly, the second shell 120 has an expanding position corresponding to the expanding state and a folding position state corresponding to the folding state. Furthermore, the first shell 110 has an accommodating slot 113, a first surface 111 and a second surface 112. The first surface 111 and the second surface 112 are opposite to each other. The accommodating slot 113 is located at the second surface 112.

The parallel linkage mechanism 200 comprises a first short rod 210, a first long rod 220, a second short rod 230 and a second long rod 240. The first short rod 210 is parallel to the first long rod 220. The second short rod 230 is parallel to the second long rod 240. Both an end of the first short rod 210 and an end of the first long rod 220 pivot on the first shell 110, respectively. Both an end of the second short rod 230 and an end of the second long rod 240 pivot on the second shell 120, respectively. The other end of the first short rod 210 pivots on the other end of the second long rod 240. The other end of the second short rod 230 pivots on the other end of the first long rod 220. A middle section of the first long rod 220 pivots on a middle section of the second long rod 240. The first long rod 220 and the first shell 110 are jointed at a first pivot point P1. The second long rod 240 and the second shell 120 are jointed at a second pivot point P2. The first long rod 220 and the second long rod 240 are jointed at a third pivot point P3. The main features of the parallel linkage mechanism 200 are that when the shell 100 is at the folding state, the first pivot point P1 coincides with the second pivot point P2, such that a start-up distance between the first pivot point P1 and the second pivot point P2 is zero. Additionally, when the shell 100 is fully expanded, there is a max distance between the first pivot point P1 and the second pivot point P2, and the first shell 110 and the second shell 120 are separated from each other by this max distance. The max distance is equal to a distance between the first pivot point P1 and the third pivot point P3 plus a distance between the second pivot point P2 and the third pivot point P3. After the foldable display device 10 is folded, whether an aspect ratio of the foldable display device 10 achieves the aesthetic concept (which is between 1.3 and 2) may be affected by the max distance. The principle is described after.

The flexible display 300 has a main body section 310 and an expandable section 320 which are connected to each other. The flexible display 300 has a display surface 302 with an area including the main body section 310 and the expandable section 320. An end of the main body section 310 is attached to the second shell 120. The expandable section 320 is movably assembled with the first shell 110.

The connecting part 400 and the elastic component 500 are both located in the accommodating slot 113. The connecting part 400 is movably assembled with the first shell 110. An end of the elastic component 500 is connected to the first shell 110, and the other end of the elastic component 500 is connected to the connecting part 400. The expandable section 320 of the flexible display 300 is movably disposed in the accommodating slot 113 of the first shell 110 by the connecting part 400.

Figure 4:
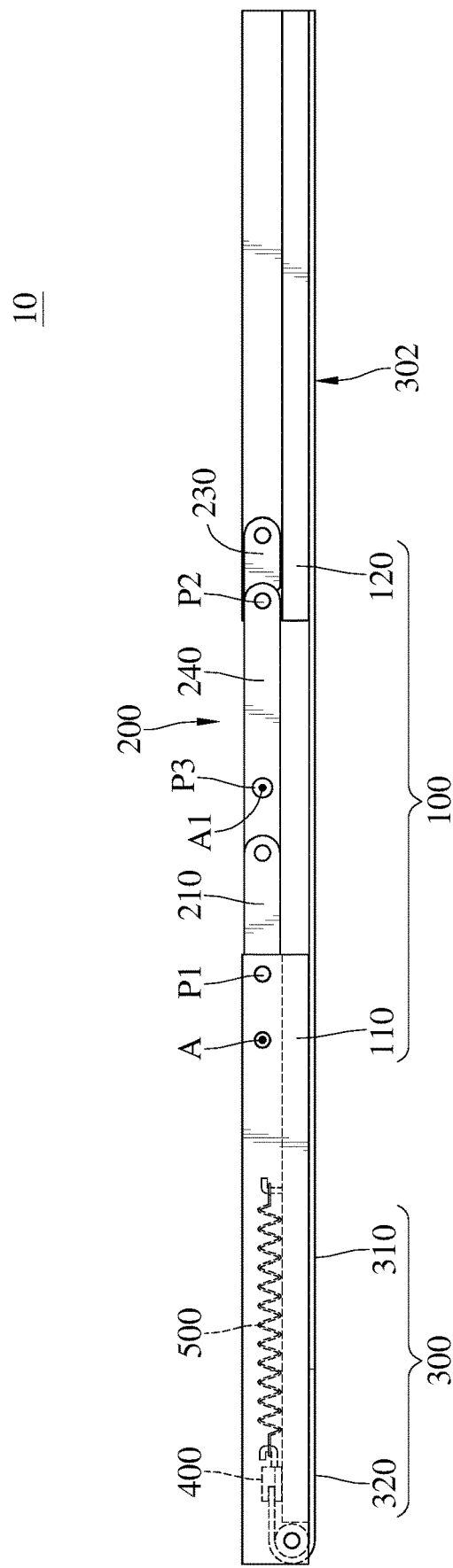
FIG. 4 is a side view of the foldable display device of FIG. 1 being at an expanding state.
Figure 5A:
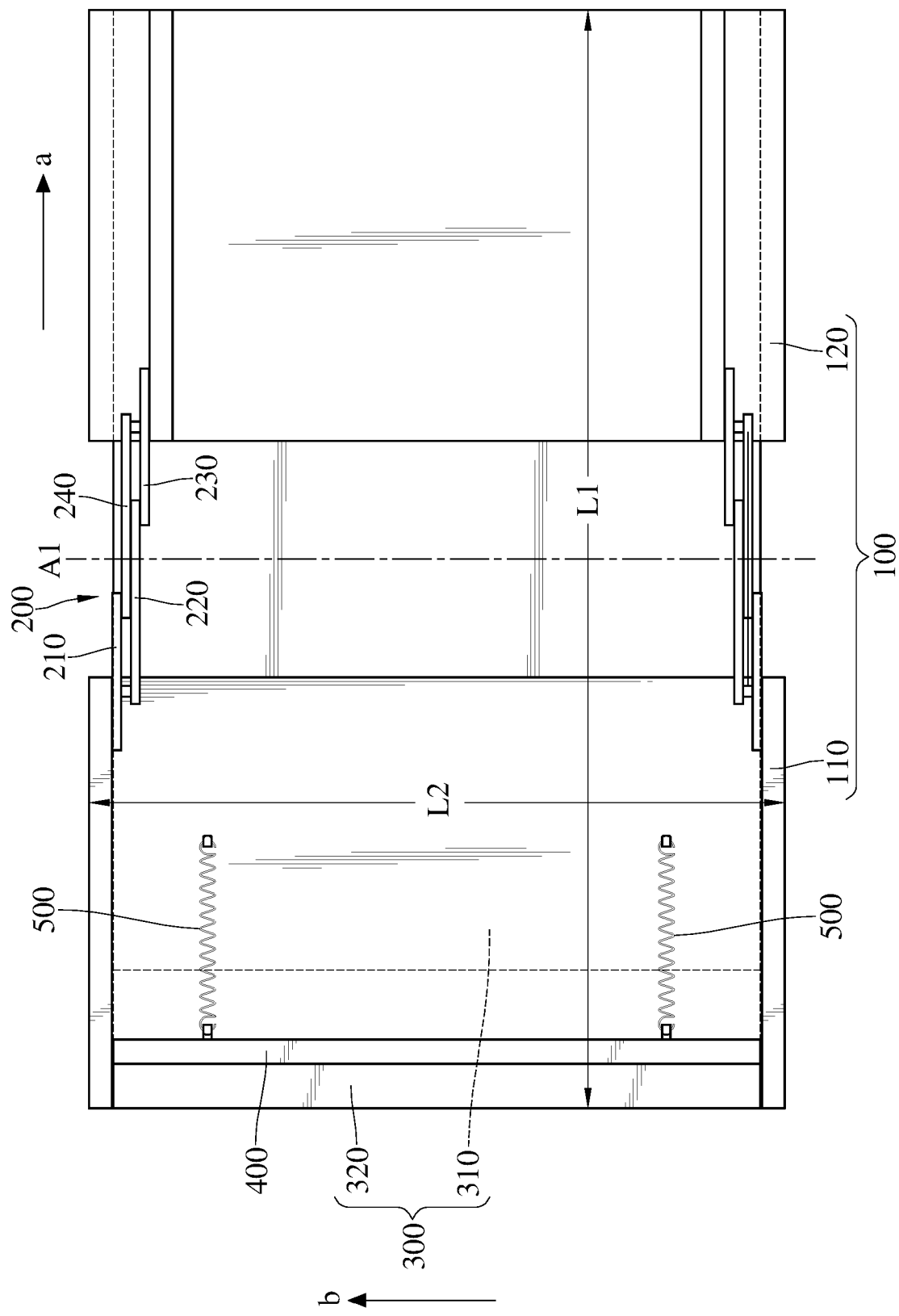
FIG. 5A is a top view in FIG. 4.
Figure 5B:
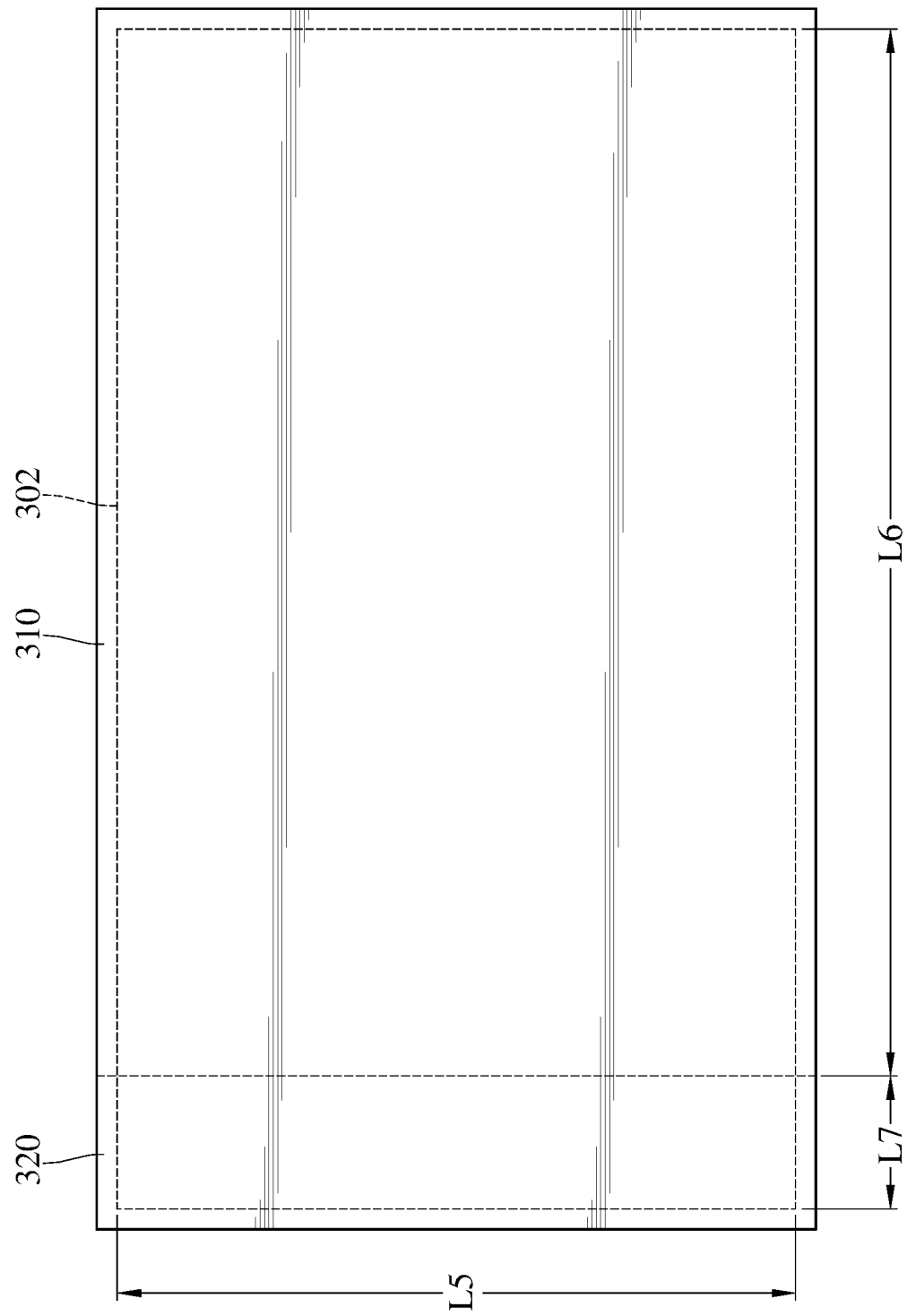
FIG. 5B is a top view of the flexible display of FIG. 4 being at the expanding state.

Please refer to FIG. 4 to FIG.7. FIG. 4 is a side view of the foldable display device of FIG. 1 being at an expanding state. FIG. 5A is a top view in FIG. 4. FIG. 5B is a top view of the flexible display of FIG. 4 being at the expanding state. FIG. 6 is a side view of the foldable display device of FIG. 1 being at a folding state. FIG. 7 is a top view in FIG. 6. To describe the dimension of the shell 100 conveniently, a first direction (directed by an arrow a) and a second direction (directed by an arrow b) are defined to be orthogonal, and the second direction is parallel to the rotating axis A1.

As shown in FIG. 4 and FIG. 5, when the foldable display device 10 is at the expanding state, the parallel linkage mechanism 200 is fully expanded (at this time, each rod of the parallel linkage mechanism 200 is parallel to one another, the max distance is kept between the first pivot point P1 and the second pivot point P2), such that the max distance is kept between the second shell 120 and the first shell 110, and the shell 100 has a first length L 1 along the first direction and a second length L2 along the second direction. The ratio of the first length L1 to the second length L2 is between 1.3 and 2. In other words, when the foldable display device 10 is at the expanding state, the length of the parallel linkage mechanism 200 may be increased and the increment is equal to a distance between the first length L1 and the second length L2.

Additionally, when the parallel linkage mechanism 200 is expanded, the second shell 120 moves relative to the first shell 110 so as to drive the expandable section 320 to move outward from the accommodating slot 113 and cover parts of the first surface 111 of the first shell 110. In other words, the first surface 111 is covered by both the expandable section 320 and the main body section 310, and the display area of the foldable display device 10 may become larger. At this time, the size of the display surface 302 is approximately equal to the size of a surface area of the shell 100 when the shell 100 is at the expanding state. Furthermore, when the expandable section 320 moves outward from the accommodating slot 113, the elastic component 500 is elastically deformed so as to store an elastic potential energy.

As shown in FIG. 6 and FIG. 7, when the foldable display device 10 is at the folding state, the parallel linkage mechanism 200 is fully folded (at this time, each rod of the parallel linkage mechanism 200 is parallel to one another, the first pivot point P1 coincides with and the second pivot point P2), and the second shell 120 is stacked on the first shell 110, such that the shell 100 has a third length L3 along the second direction and a fourth length L4 along the first direction. The ratio of the third length L3 to the fourth length L4 is also between 1.3 and 2. At this time, the elastic potential energy of the elastic component 500 is released, so as to drive the expandable section 320 to move backward to and to be disposed in the accommodating slot 113.

To be noticed, the aspect ratio of the foldable display device 10 still achieves the aesthetic concept (which is between 1.3 and 2) no matter the foldable display device 10 is folded or expanded. The principle is that the parallel linkage mechanism 200 is adapted to increase the length of the foldable display device 10 along the first direction. When the foldable display device 10 is at the expanding state, the length of the foldable display device 10 along the first direction becomes the first length L1, and the increment of the length along the first direction is the max distance between the first length L1 and the second length L2. In other words, the max distance between the first length L1 and the second length L2 is adapted to offset the length of the foldable display device 10 so as to adjust the aspect ratio of the foldable display device 10 to be kept between 1.3 and 2.

For example, when the foldable display device 10 is at the expanding state, the length (L1) of the shell 100 is $\alpha$, the width (L2) of the shell 100 is 1, then it satisfies the following condition: $1.3<\alpha$ (equal to the aspect ratio) $<2$. To make the aspect ratio of the foldable display device 10 be kept between 1.3 and 2, the max distance shall be equal to ($\alpha-2/\alpha$). Similarly, when the foldable display device 10 is at the folding state, the length (L3=L2) of the shell 100 is 1, the width (L4) of the shell 100 is $1/\alpha$. Thus, in accordance with the above description, if the aspect ratio a is predetermined between 1.3 and 2 when the foldable display device 10 is at the expanding state, then the aspect ratio a is also between 1.3 and 2 when the foldable display device 10 is at the folding state.

The size of the flexible display 300 will be described as follows. As shown in FIG. 5 and FIG. 6, the first shell 110 and the second shell 120 are covered by the flexible display 300 when the foldable display device 10 is at the folding state. Additionally, the foldable display device 10 has a thickness T when the foldable display device 10 is at the folding state. Accordingly, the thickness T of the foldable display device 10 shall be considered when designing the length of the expandable section 320 of the flexible display 300. When the foldable display device 10 is located at the expanding position, the flexible display 300 has a fifth length L5 along the second direction. Additionally, the main body section 310 has a sixth length L6 and the expandable section 320 has a seventh length L7 both along the first direction. The folding display device 10 satisfies the following condition: if $L5:(L6+L7)=1:\alpha$, then $L7 \geq (\alpha - 2/\alpha) - T$. Accordingly, no matter when the flexible display 300 is at either the expanding state or the folding state, the aspect ratio is approximately equal to $\alpha$.

To be noticed, in this embodiment, the first shell 110 is covered by the flexible display 300 when the foldable display device 10 is at the folding state. Accordingly, the thickness T of the foldable display device 10 needs to be considered when designing the length of the expandable section 320. However, in other embodiments, the flexible display 300 may be interposed between the first shell 110 and the second shell 120, such that the thickness T of the foldable display device 10 does not need to be considered when designing the length of the expandable section 320. In other words, the length of the expandable section 320 (L7) satisfies the following condition: $L7 \geq (\alpha - 2/\alpha)$.

Figure 8:
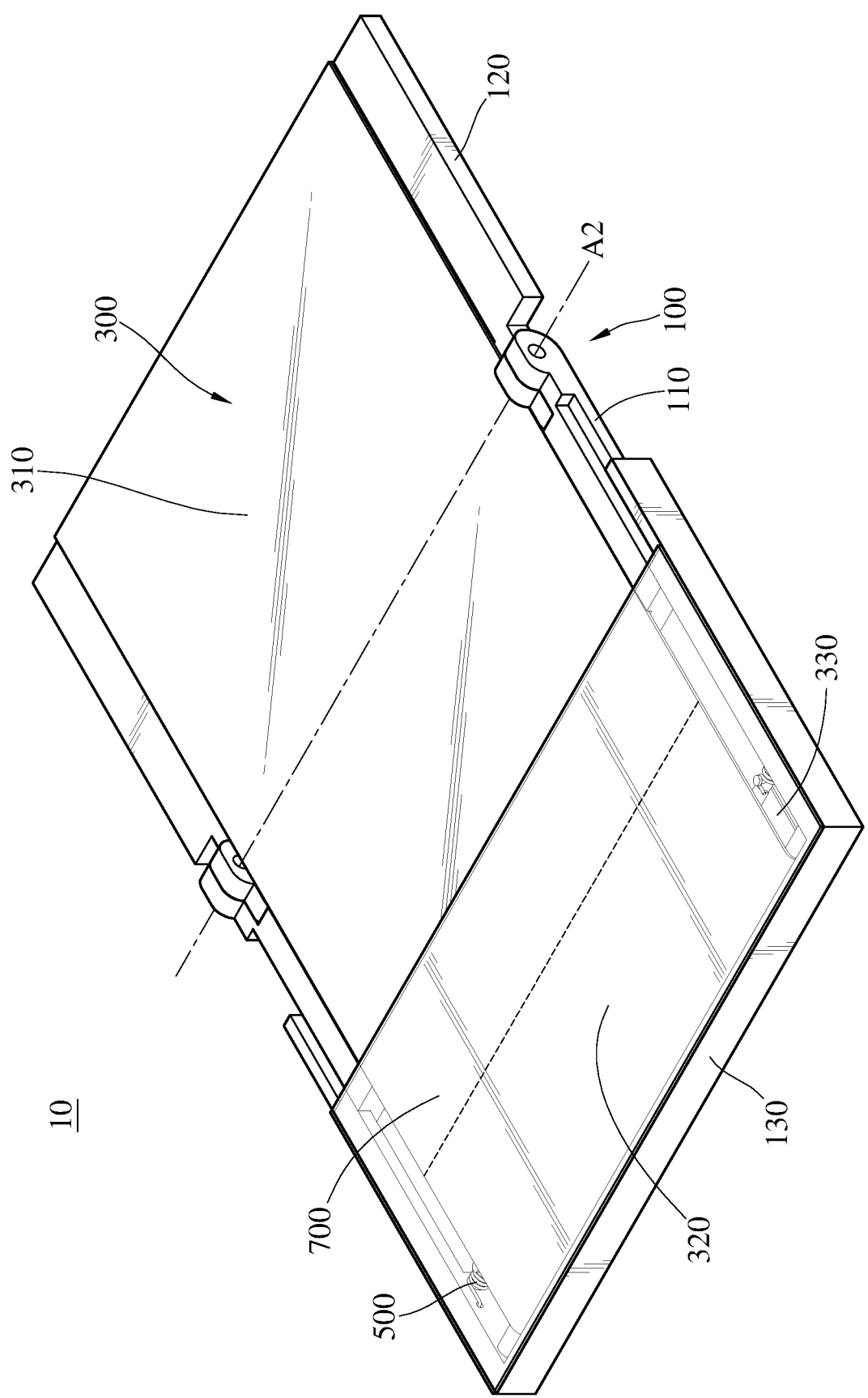
FIG. 8 is a perspective view of a foldable display device according to a second embodiment of the disclosure.
Figure 9:
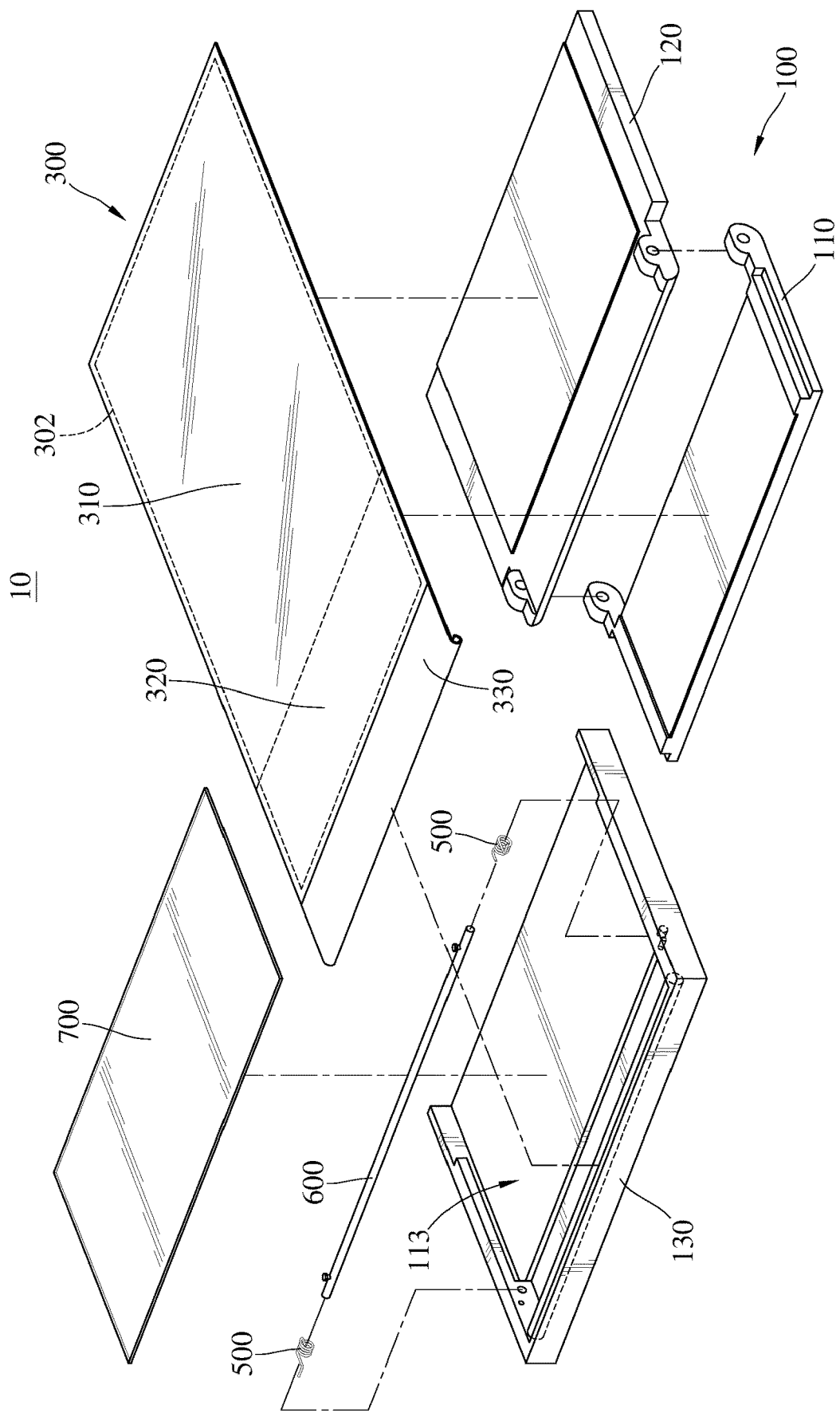
FIG. 9 is an exploded view in FIG. 8.
Figure 10:
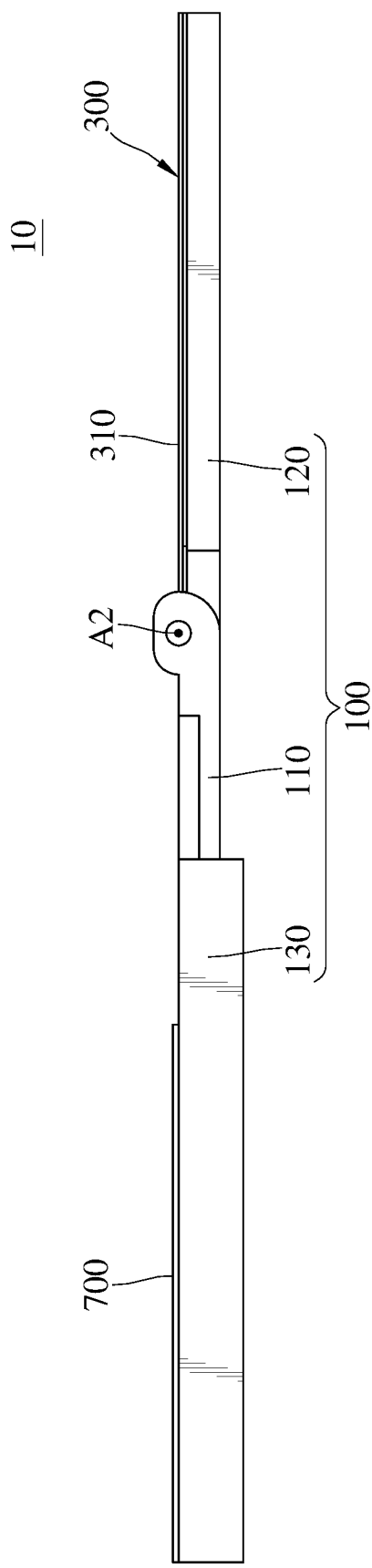
FIG. 10 is a side view in FIG. 8.

Please refer to FIG. 8 to FIG. 10. FIG. 8 is a perspective view of a foldable display device according to a second embodiment of the disclosure. FIG. 9 is an exploded view in FIG. 8. FIG. 10 is a side view in FIG. 8. In this embodiment, the foldable display device 10 comprises a shell 100, a parallel linkage mechanism 200, a flexible display 300, a reel shaft 600, an elastic component 500 and a transparent plate 700.

In this embodiment, the shell 100 comprises a first shell 110, a second shell 120 and a third shell 130. The second shell 120 pivots on the first shell 110. A rotating axis A2 is parallel to a second direction. The second shell 120 is capable of rotating around the rotating axis A2 relative to the first shell 110, so as to have an expanding position and a folding position. The third shell 130 is movably assembled with the first shell 110 and has an approach position and an extension position. The third shell 130 has an accommodating slot 113.

The flexible display 300 has a main body section 310, an expandable section 320 and an extending section 330. The main body section 310 is connected to a side of the expandable section 320, and the extending section 330 is connected to the other side of the expandable section 320 opposite to the main body section 310. Two opposite sides of the main body section 310 are connected to the first shell 110 and the second shell 120, respectively. The extending section 330 is movably assembled with the third shell 130

The reel shaft 600, which pivots on the third shell 130, is located inside the accommodating slot 113. Two opposite ends of the elastic component 500 are affixed to the third shell 130 and the reel shaft 600, respectively. The extending section 330 is connected to the reel shaft 600. The transparent plate 700 is disposed at the third shell 130 and stacked on the flexible display 300.

Figure 11:
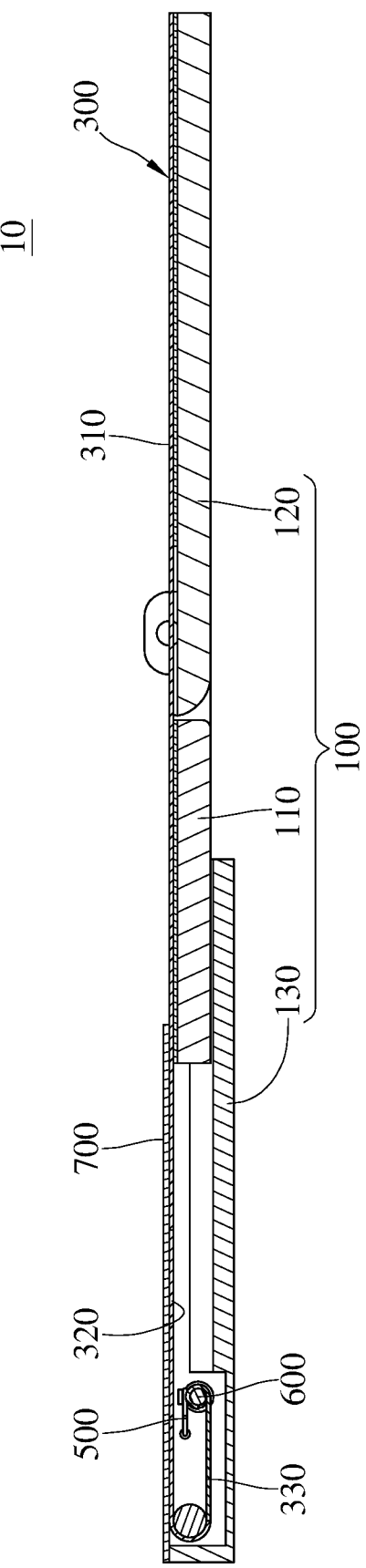
FIG. 11 is a sectional view of the foldable display device of FIG. 8 being at an expanding state.
Figure 12:
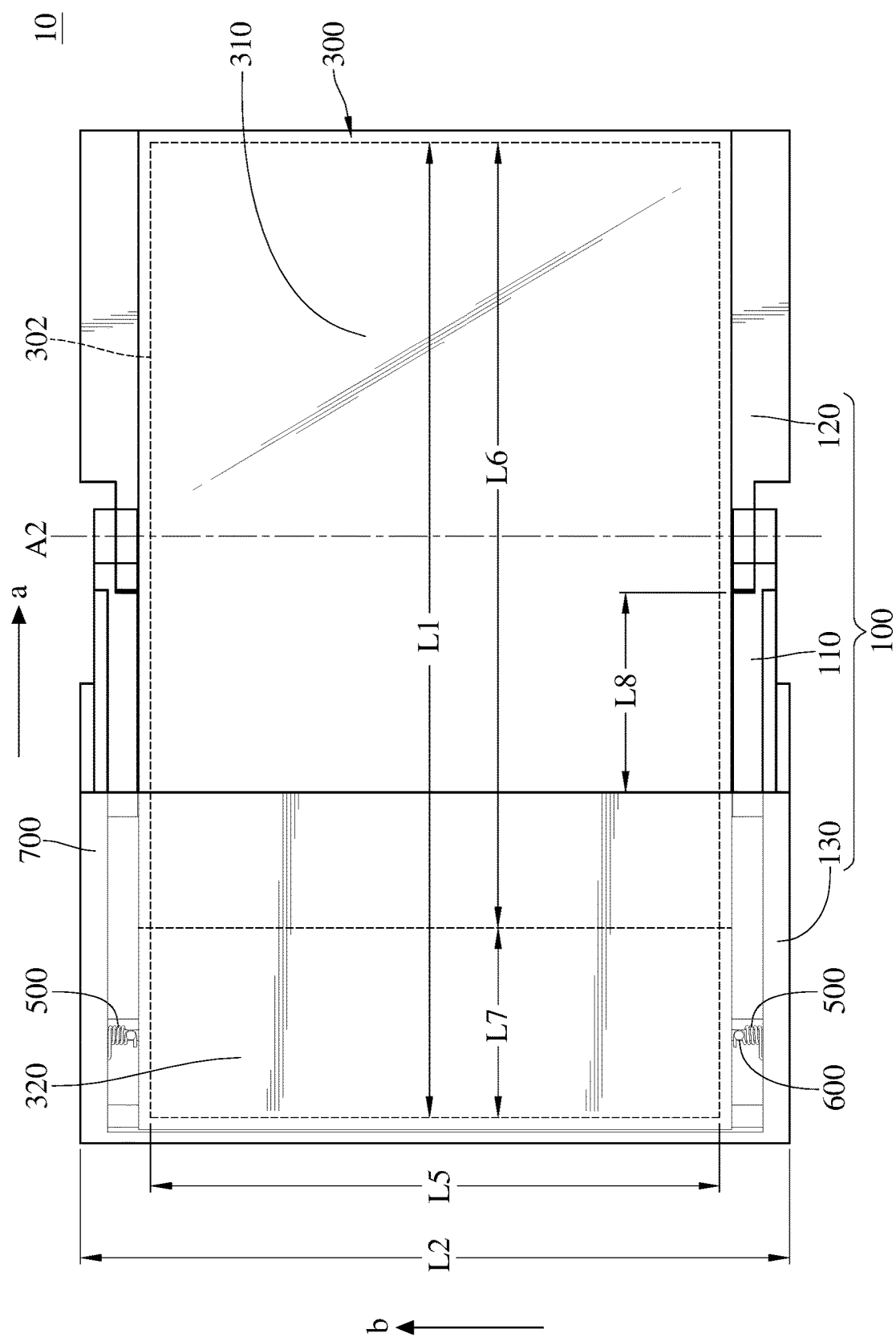
FIG. 12 is a top view in FIG. 8.
Figure 13:
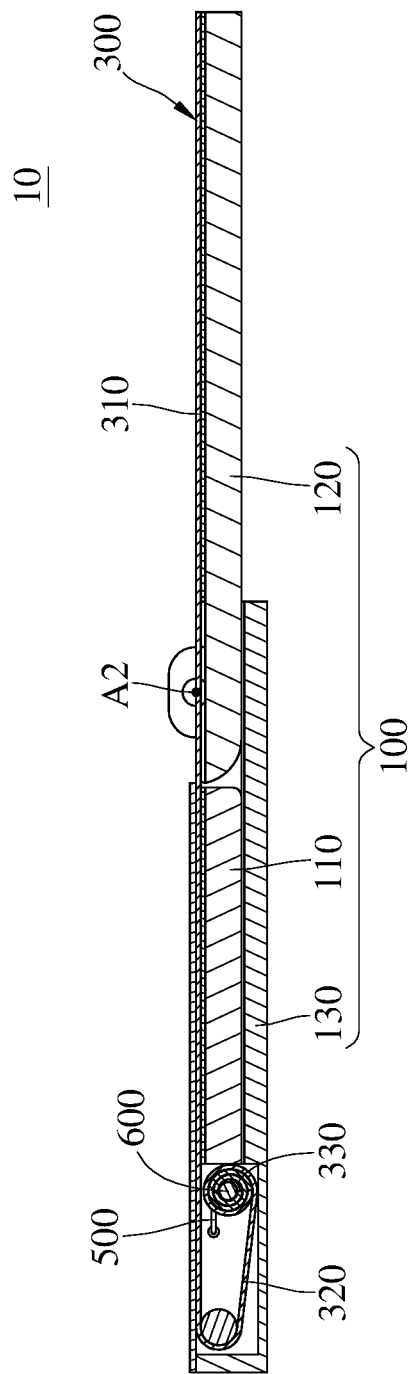
FIG. 13 is a sectional view in FIG. 8 when a first shell is located at an expanding position and a third shell is located at an approach position.
Figure 14:
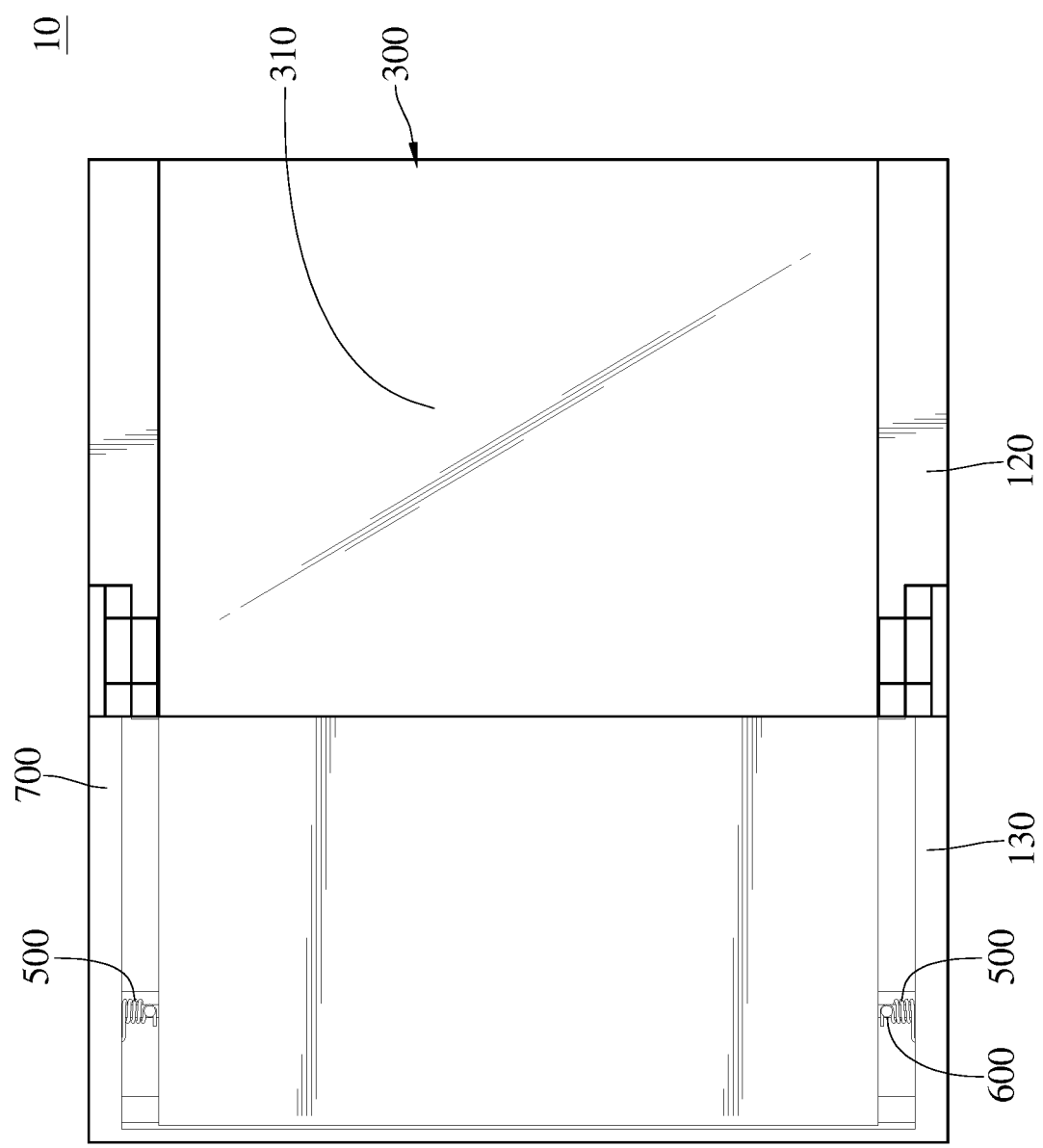
FIG. 14 is a top view in FIG. 13.
Figure 15:
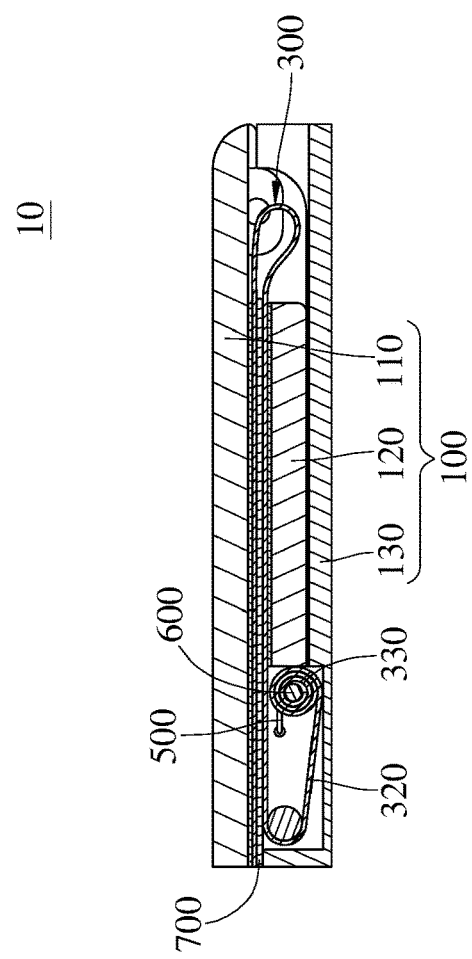
FIG. 15 is a sectional view of the foldable display device of FIG. 8 being at a folding state.
Figure 16:
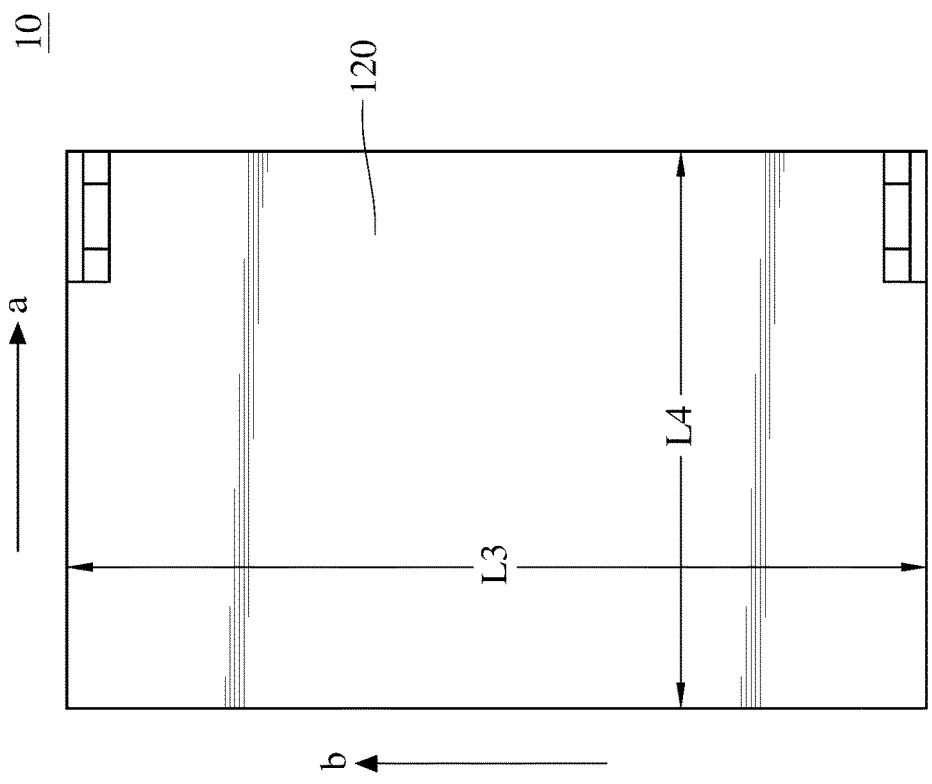
FIG. 16 is a top view in FIG. 15.

Please refer to FIG. 11 to FIG. 16. FIG. 11 is a sectional view of the foldable display device of FIG. 8 being at an expanding state. FIG. 12 is a top view in FIG. 8. FIG. 13 is a sectional view in FIG. 8 when a first shell is located at an expanding position and a third shell 130 is located at an approach position. FIG. 14 is a top view in FIG. 13. FIG. 15 is a sectional view of the foldable display device of FIG. 8 being at a folding state. FIG. 16 is a top view in FIG. 15. To describe the dimension of the shell 100 conveniently, a first direction (directed by an arrow a) and a second direction (directed by an arrow b) are defined to be orthogonal, and the second direction is parallel to the rotating axis A2.

As shown in FIG. 11 and FIG. 12, when the foldable display device 10 is at the expanding state, the second shell 120 is located at the expanding position and the third shell 130 is located at the extension position. Meanwhile, the flexible display 300 is stretched by the third shell 130 and the second shell 120, so as to drive the expandable section 320 to move outward from the accommodating slot 113 and cause the elastic component 500 to be elastically deformed. At this time, the foldable display device 10 has a first length L1 along the first direction and a second length L2 along the second direction, and the ratio of the first length L1 to the second length L2 is between 1.3 and 2. Additionally, the aspect ratio of the flexible display 300 exposed outward is approximately equal to the aspect ratio of the foldable display device 10.

To be noticed, when the flexible display 300 is at the expanding state, the bottom of the expandable section 320 is not supported by a shell body. Thus, the transparent plate 700 is stacked on the expandable section 320 to prevent the expandable section 320 from being touched inadvertently to form a cavity (that is, the expandable section 320 is depressed).

Then, as shown in FIG. 13 and FIG. 14, the third shell 130 moves backward to the approach position, and the foldable display device 10 is at a half-folding state at the same time.

Then, as shown in FIG. 15 and FIG. 16, when the foldable display device 10 is at the folding state, the second shell 120 is stacked on the first shell 110. Meanwhile, the elastic potential energy of the elastic component 500 is released, so as to drive the expandable section 320 to move backward to and to be disposed in the accommodating slot 113. At this time, the foldable display device 10 has a third length L3 along the second direction and a fourth length L4 along the first direction. The ratio of the third length L3 to the fourth length L4 is between 1.3 and 2. Additionally, the aspect ratio of the flexible display 300 exposed outward is also approximately equal to the aspect ratio of the foldable display device 10.

To be noticed, the aspect ratio of the foldable display device 10 still achieves the aesthetic concept (which is between 1.3 and 2) no matter when the foldable display device 10 is folded or expanded. The principle is the same as the first embodiment (as shown in FIG. 1). The difference between the second embodiment and the first embodiment is that the aspect ratio of the foldable display device 10 is adjusted by the parallel linkage mechanism 200 in the first embodiment (as shown in FIG. 1), and the aspect ratio of the foldable display device 10 is adjusted by the third shell 130 which moves relative to first shell 110 in the second embodiment. In other words, the length of the expandable section 320 (seventh length L7) is equal to an extended length of the third shell 130 relative to first shell 110 (the length which the third shell 130 stretched most).

Furthermore, when the shell is at the folding state, the expandable section 320 may, but not limited to, move backward to the accommodating slot 113 by the connecting part 400 and the elastic component 500 (in the first embodiment, as shown in FIG. 1), and the expandable section 320 may be, but not limited to, furled by the reel shaft 600 and the elastic component 500 to move backward to the accommodating slot 113 (in the second embodiment, as shown in FIG. 8). For example, the expandable section 320 may move backward to the accommodating slot 113 by the reel shaft 600 and the elastic component 500 in the first embodiment, and the expandable section 320 may be furled by the connecting part 400 and the elastic component 500 to move backward to the accommodating slot 113 in the second embodiment.

According to the foldable display device of the disclosure, the length variation of the parallel linkage mechanism and the extension of the third shell are adapted to adjust the aspect ratio of the foldable display device, such that the aspect ratio of the foldable electronic product may achieve the aesthetic concept (the aspect ratio shall be between 1.3 and 2) no matter when the foldable electronic product is folded or expanded.

The disclosure will become more fully understood from the said embodiment for illustration only and thus does not limit the disclosure. Any modifications within the spirit and category of the disclosure fall in the scope of the disclosure.

What is claimed is:

1. A foldable display device, comprising:
    a shell having an expanding state and a folding state, the shell comprising a first shell, a second shell and a third shell, the second shell pivoting on the first shell and being capable of rotating around a rotating axis relative to the first shell so as to have an expanding position and a folding position state, the third shell slidably coupled to the first shell and movably assembled with the first shell and having an approach position and an extension position; when the shell is located at the expanding state, the second shell is located at the expanding position, and the third shell is located at the extension position; when the shell is located at the folding state, the second shell is located at the folding position, and the third shell is located at the approach position;
    wherein, a first direction and a second direction are defined to be orthogonal, wherein the rotating axis is paralleling to the second direction; when the shell is at the expanding state, the shell has a first length L1 along the first direction and a second length L2 along the second direction, the ratio of the first length L1 to the second length L2 is between 1.3 and 2; when the shell is at the folding state, the shell has a third length L3 along the second direction and a fourth length L4 along the first direction, and the ratio of the third length L3 to the fourth length L4 is also between 1.3 and 2; and
    a flexible display having a main body section and an expandable section which are connected to each other, wherein the main body section is assembled with the second shell, the expandable section is movably assembled with the third shell, the third shell has an accommodating slot, wherein when the second shell is located at the folding position, the expandable section is disposed to the accommodating slot, when the second shell is located at the expanding position, the flexible display is stretched by the third shell and the second shell so as to drive the expandable section to move outward from the accommodating slot.

2. The foldable display device according to claim 1, wherein when the second shell is located at the expanding position, an extended length of the third shell relative to the first shell is a length of expandable section along the first direction.

3. The foldable display device according to claim 1, further comprising an elastic component with two ends, wherein the two ends of the elastic component are opposite to each other and affixed to the third shell and the expandable section respectively, when the shell is located at the expanding position, the expandable section is adapted to move outward from the accommodating slot to cause the elastic component to be elastically deformed so as to store an elastic potential energy, and when the shell is located at the folding position, the elastic potential energy is released so as to drive the expandable section to move backward to and be disposed in the accommodating slot.

4. The foldable display device according to claim 3, further comprising a connecting part connected to and located between the elastic component and the expandable section.

5. The foldable display device according to claim 1, further comprising a reel shaft and an elastic component with two ends, wherein the reel shaft pivots on the third shell and is located inside the accommodating slot, the two ends of the elastic component are opposite to each other and affixed to the third shell and the reel shaft respectively, the flexible display further has an extending section, an end of the extending section is connected to an end of the expandable section which is away from the main body section, the other end of the extending section is connected to the reel shaft, wherein when the shell is located at the expanding position, the expandable section is adapted to move outward from the accommodating slot to cause the elastic component to be elastically deformed so as to store an elastic potential energy, when the shell is located at the folding position, the elastic potential energy is released so as to furl the extending section by the reel shaft, whereby driving the expandable section to be disposed in the accommodating slot.

* * * * *